March 22, 1955
H. R. FISCHER
2,704,681
RETAINER ASSEMBLIES
Filed Aug. 28, 1952
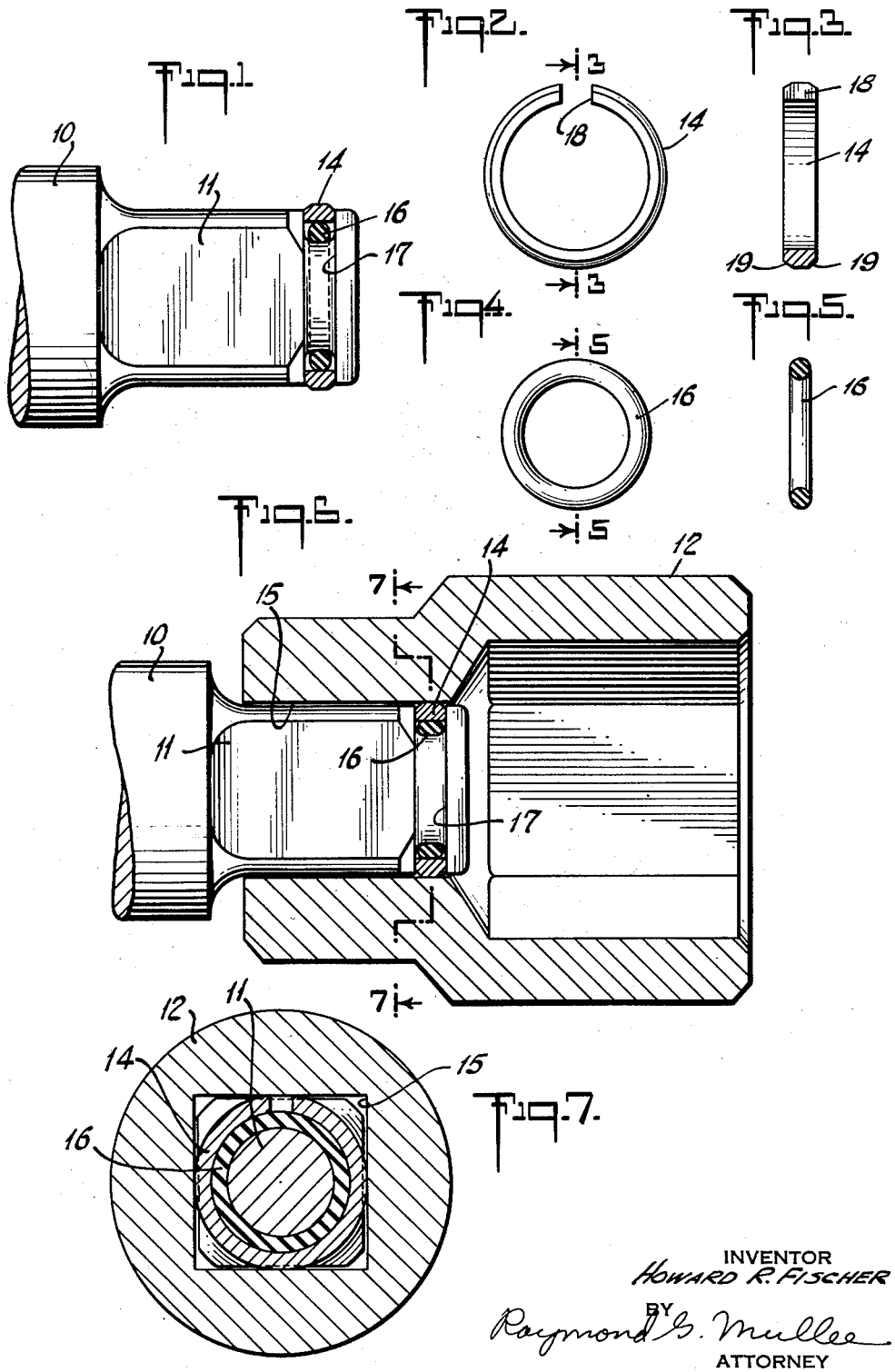
INVENTOR
HOWARD R. FISCHER
BY Raymond G. Mullee
ATTORNEY

United States Patent Office 2,704,681
Patented Mar. 22, 1955

2,704,681

RETAINER ASSEMBLIES

Howard R. Fischer, Utica, N. Y., assignor to Chicago Pneumatic Tool Company, New York, N. Y., a corporation of New Jersey Application August 28, 1952, Serial No. 306,906

5 Claims. (Cl. 287—53)

This invention relates to a retainer arrangement for maintaining telescopic members in fixed axial relation, and more particularly, to a retainer assembly for maintaining a socket upon a tool shank.

The problem of maintaining a socket upon a tool shank, particularly the shank or spindle of certain power driven tools, such as impact wrenches, has been met by the use of various types of retainer arrangements. Such arrangements may be of the type wherein the socket is maintained upon the shank by means of a removable pin, or may be of the type wherein a pin or button is resiliently maintained in engagement with a hole formed in the adjacent member. While in general such arrangements prove satisfactory, each may display certain disadvantages, such as shank breakage due to reduced cross-section, loss of the removable pin, and breaking or jamming of the button maintaining means. In tools of the impact wrench type, the high shock loads due to repeated impact blows, may cause breakage due to fatigue stress, particularly on shanks having pin holes, or areas of reduced cross-section.

Among the objects of the invention, is the provision of a retainer arrangement that is positive and reliable in action, of simple structure making it easy to use and of low cost, and which is free of the disadvantages associated with certain socket retainers discussed above.

Another object is to provide more effective means of retaining sockets and other accessories on the driving shaft of an impact wrench.

Other objects and features of the invention will be apparent from the following description when read in conjunction with the accompanying drawing, wherein:

Fig. 1 is a view, partially in longitudinal section, and showing the retainer arrangement of the invention as applied to a tool shank;

Fig. 2 is a plan view of a split ring forming part of the retainer arrangement;

Fig. 3 is a cross-section view taken along line 3—3 of Fig. 2;

Fig. 4 is a plan view of an O ring forming part of the retainer arrangement;

Fig. 5 is a cross-section view taken along line 5—5 of Fig. 4;

Fig. 6 is a view, partially in longitudinal section, illustrating a socket in position on a tool shank having a retainer arrangement of the invention; and Fig. 7 is a cross-section view taken along line 7—7 of Fig. 6.

Referring now to Fig. 1, numeral 10 indicates a portion of a tool shank, or shaft, which is rotatable by power means, such as an impact clutch (not shown) and which has a square end portion 11 adapted to drive a socket member 12, such as is well known in the art. The socket 12 is formed with a square hole 15 adapted to receive the tool shank portion 11.

The retainer arrangement, or assembly, comprises an annular flexible means 14, and a compression means 16, both of which are mounted within a circumferential groove or recess 17 formed in the portion 11, of tool shank 10, near the front end thereof.

The flexible means 14 is in the form of a split ring, preferably made from metal such as steel, and has a gap 18, which parts the ring as shown. By means of the gap 18, the ring is made more flexible so that the diameter may be reduced or expanded as a result of compressive forces applied to the ring in the diametrical plane. Chamfers 19 are provided on each of the outer edges of the ring so that the socket 12 can be applied to the shaft portion 11 without positive interference with the ring. Ring 14, is case-hardened on the outer surface to resist wear, and has a soft core to insure against breakage due to shock or fatigue loads.

The compression means 16 is in the form of an O ring, preferably made from one of the long wearing oil-resistant types of rubber, such as "neoprene." The exterior diameter of the ring 16 is approximately equal to the interior diameter of the split ring 14.

Split ring 14 is adapted to be mounted upon the ring 16 in groove 17, and project slightly at four places from the groove, as best seen in Fig. 7, so as to frictionally engage surfaces of hole 15, of the socket 12. As a result of the frictional engagement between the projections of ring 14 and the hole 15, the socket 12 is maintained upon the tool shank portion 11. The holding power of the frictional engagement can be varied by selection of rings 14 of different sizes or with different values of compressibility.

It is seen that applicant's invention provides a socket retainer arrangement, which is exceedingly simple in structure, of low initial and maintenance cost, and wherein the tool shank is especially improved to provide long and satisfactory service. Also, this arrangement permits the operator to pull the socket 12 off the square shank portion 11 whenever that is desired, while preventing accidental release.

It will be apparent that a valuable feature of the invention is the fact that the split ring 14 is always held concentric with the axis of the tool shank 10, by action of the O ring 16. This feature avoids the necessity of first aligning the split ring 14 by hand, prior to placement of the socket 12 on the shank, which is necessary in prior art structures incorporating, a split-ring type of socket holding arrangement. Such automatic alignment which the subject invention affords, promotes greater speed and convenience in affixing the socket to the tool shank.

While the invention is illustrated as applied to a tool socket arrangement, it will be appreciated that it could find application equally as well to practically any telescopic joint assembly. Likewise, the invention is applicable to connections other than those with square shanks, such as wherein the telescoping surfaces are round, elliptical, or irregular in cross-section. As a variation to the embodiment illustrated, it will be apparent that the retainer arrangement rather than being applied to a tool shank to frictionally engage a socket member, may be applied to a socket member, in the shank receiving hole, to thereby frictionally engage a tool shank.

It may be further pointed out that the split ring 14, instead of frictionally engaging the hole in the socket member 12, may be adapted to enter a groove, or depression (not shown), formed in the socket member, to thus provide a more positive holding arrangement.

What is claimed is:

1. In an impact wrench, a socket having a square hole at its rear end, a tool shank having a front end portion of square cross-section fitting within the square hole to drive the socket, said front end portion having an annular groove near the front extremity thereof, a split metal ring received partly within the groove and adapted to expand outwardly beyond the groove, the inside diameter of the metal ring being greater at all times than the diameter of the bottom wall of the groove, the radius of the outside of the ring when disassembled being greater than the apothem of the square hole whereby the metal ring frictionally engages the four walls of the hole with tangential contact, the front and rear sides of the ring engaging the sides of the groove to prevent axial movement of the ring in the groove and thus frictionally lock the socket against axial movement on the shank, and means for centering the metal ring to facilitate assembly and disassembly of the socket on the shank, said centering means comprising a resilient O ring located entirely within the groove and surrounded by the split metal ring, the inside of the O ring snugly engaging the inside wall of the groove, the cross-sectional diameter of the O ring being less than the width of the groove, the O ring being under radial compression when the metal ring is located within the square hole of the socket, thus increasing the amount of frictional force of the metal ring against the socket.

2. In an impact wrench, a detachable connection between a tool shank and a socket according to claim 1 in which the outside front edge of the metal ring is chamfered to facilitate entry of the assembled shank, O ring and metal ring into the square hole of the socket.

3. In an impact wrench, a detachable connection between a tool shank and a socket according to claim 1 in which the outer edges of the metal ring at the front and rear thereof are chamfered to facilitate insertion and removal of the metal ring with respect to the square hole in the socket when the metal ring is in position on the O ring and tool shank.

4. In an impact wrench, a detachable connection between a tool shank and a socket according to claim 1 in which the metal ring is case hardened on the outer surface to resist wear and has a soft core to prevent breakage due to shock or fatigue loads.

5. In an impact wrench, a socket having a square hole at its rear end, a tool shank having a front end portion of square cross-section fitting within the square hole to drive the socket, said front end portion having an annular groove near the front extremity thereof, a split metal ring received partly within the groove and adapted to expand outwardly beyond the groove, the inside diameter of the metal ring being greater at all times than the diameter of the bottom wall of the groove, the radius of the outside of the ring when disassembled being greater than the apothem of the square hole whereby the metal ring frictionally engages the four walls of the hole with tangential contact, the front and rear sides of the ring engaging the sides of the groove to prevent axial movement of the ring in the groove and thus frictionally lock the socket against axial movement on the shank, and means for centering the ring to facilitate assembly of the socket on the shank, said ring having a chamfered or conical surface at its outer front edge, the front extremity of the chamfered surface having a radius which is always less than the apothem of the square hole.

References Cited in the file of this patent

UNITED STATES PATENTS

| | | |
|---|---|---|
| 861,143 | Scott | July 23, 1907 |
| 1,442,223 | Knebusch | Jan. 16, 1923 |
| 1,776,646 | Wilson | Sept. 23, 1930 |
| 2,099,722 | Byers | Nov. 13, 1937 |
| 2,220,610 | Miller | Nov. 5, 1940 |
| 2,441,131 | Blackman et al. | May 11, 1948 |
| 2,470,800 | Ashton | May 24, 1949 |
| 2,620,178 | Lehman | Dec. 2, 1952 |

FOREIGN PATENTS

| | | |
|---|---|---|
| 997,611 | France | Sept. 12, 1951 |